United States Patent [19]

Ou-Yang

[11] Patent Number: 5,078,933
[45] Date of Patent: Jan. 7, 1992

[54] PROCESS FOR MAKING GRAINED AND FOAMED PLASTIC ARTICLE

[76] Inventor: Chiu Ou-Yang, No. 231, Cheng-Kung San Road, Nan-Kang Industrial Park, Nantu City, Taiwan

[21] Appl. No.: 598,919

[22] Filed: Oct. 16, 1990

[51] Int. Cl.⁵ .............................................. B29C 43/20
[52] U.S. Cl. .................................... 264/46.1; 264/77; 264/115
[58] Field of Search ............. 264/115, 126, 321, 46.1, 264/77

[56] References Cited

U.S. PATENT DOCUMENTS

| | | | |
|---|---|---|---|
| 2,044,585 | 6/1936 | Macht | 264/77 |
| 3,940,464 | 2/1976 | Davis | 264/140 |
| 3,961,839 | 7/1976 | Taylor | 264/126 |
| 4,031,179 | 6/1977 | Tatzel et al. | 264/126 |
| 4,923,657 | 5/1990 | Gembinski et al. | 264/126 |

Primary Examiner—Jan H. Silbaugh
Assistant Examiner—Brian J. Eastley
Attorney, Agent, or Firm—Ladas & Parry

[57] ABSTRACT

A grained and foamed plastic article is fabricated by forming foamed plastic grains which are then covered with coating layers with a color different from that of the grains. The coated grains are then formed into a desired shape by heating them under pressure. The grained pattern formed thereby includes clear grain boundary lines which enhance the esthetic effect of the formed article.

5 Claims, 3 Drawing Sheets

FIG. I

PROCESS FOR MAKING GRAINED AND FOAMED PLASTIC ARTICLE

BACKGROUND OF THE INVENTION

1. Field of The Invention

This invention relates to a process for making a grained and foamed plastic article, and particularly to a process in which differently colored foamed plastic grains are mixed and formed into a grained article.

2. Brief Description of The Related Prior Art

Foamed plastic materials are widely used in various commodities such as shoes, shoe soles, toys, stationary, building materials, etc. These foamed plastic articles are usually provided with different colors and patterns for esthetic purposes.

Typically, a foamed plastic sheet with a grained pattern is fabricated by forming differently colored polymeric foam compositions into grains which are then mixed in a ratio according to the desired color and grained pattern and formed into a required shape. The grained pattern formed by such a process does not present clear grain boundary lines between adjacent grains.

SUMMARY OF THE INVENTION

An object of the invention is to provide a process for fabricating a grained and foamed plastic article, which process provides clear grain boundary lines between adjacent grains, thereby improving the esthetic effect of the grained pattern According to the present invention, a process for making a grained and foamed plastic article comprises the steps of: (a) forming a foam composition into foamed plastic rods by an extrusion process; (b) coating said foamed plastic rods with a color different from that of said foamed plastic rods; (c) cutting the foamed plastic rods into grains; and (e) forming the coated grains into a desired shape by heating them under pressure.

The foam composition may be prepared by using a polymeric material selected from the group consisting of natural rubber, styrene butadiene rubber, polyethylvinylacetate, polyethylene, and polypropylene. The coating step (b) may be done by a dipping process or a spray process before the step (c). Alternatively, the coating step (b) may be done after step (c) by mixing said foamed grains with a coloring agent.

The exemplary preferred embodiments will be described in detail with reference to the accompanying drawings, of which:

DETAILED DESCRIPTION OF THE PREFERRED EMBODIMENT

Figure 1:
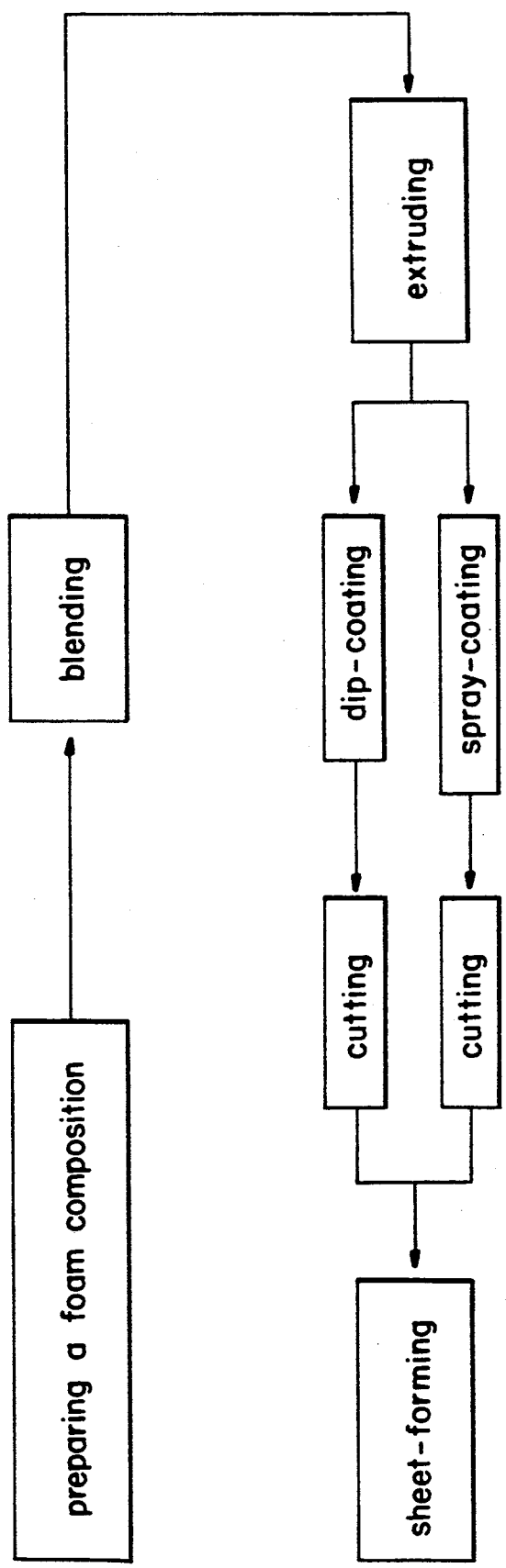
FIG. 1 is a flow diagram illustrating a preferred embodiment of the process of the present invention.

Referring to FIG. 1, in a preferred process embodying the present invention, a foam composition is prepared by using ingredients including a polymeric substance, a foaming agent, a curing agent, a coloring agent, a solvent and other necessary additives. The polymeric substance may be selected from a natural rubber, polystyrenebutadiene, polyethylene, polyethylvinylacetate, polystyrene, polyacrylonitrilebutadiene, polyvinylchloride, etc. The ingredients are blended in an appropriate ratio.

Then, the blended foam composition is formed into rods by extrusion. The extruded rods are then divided into two groups which are separately passed through a dip-coating tank and a spray-coating device, thereby coating the divided extruded rods in two different colors. The color of the coating covering the rods is different from that of the body of the rods. The coated rods are cut into grains which are then mixed and formed into a sheet. The product thus fabricated presents a grained pattern with clear grain boundary lines between adjacent grains. The pattern has two colors: the grain boundary lines are on color and the parts enclosed by the grain boundary lines are different color.

Figure 2:
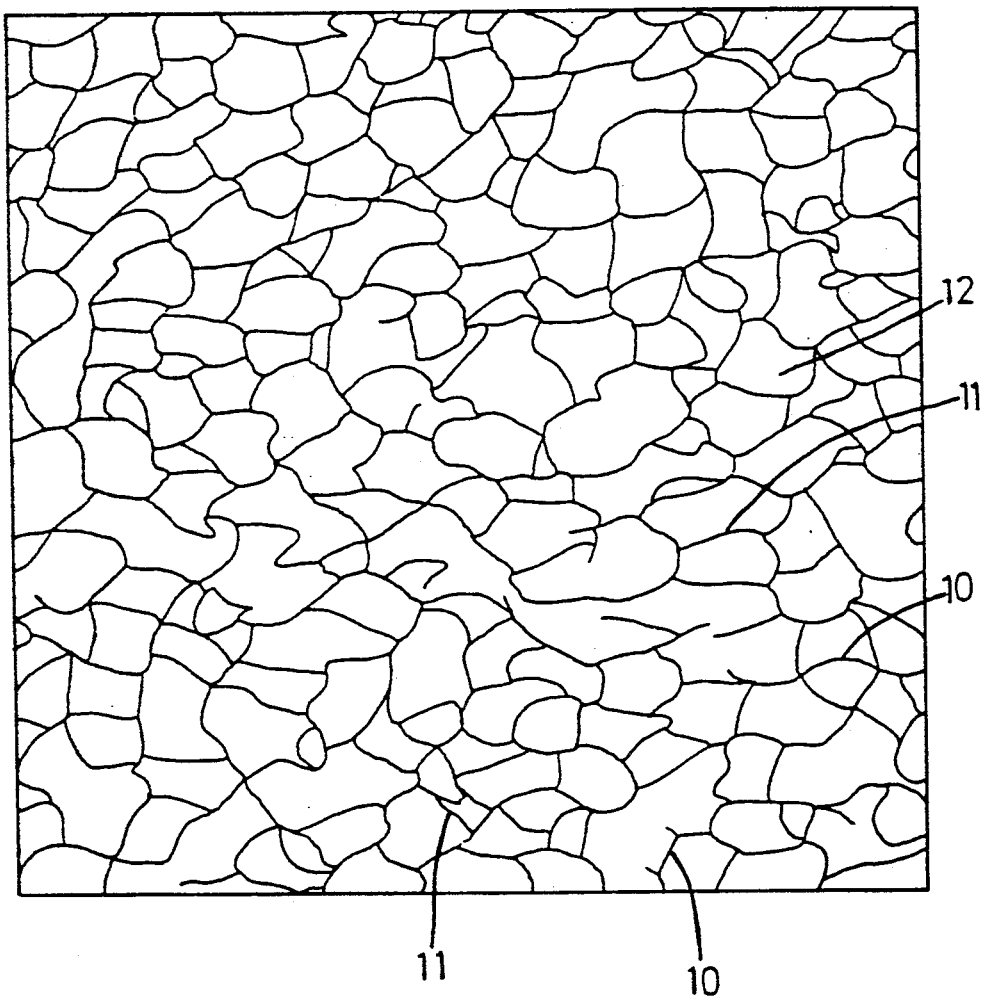
FIG. 2 shows a grained and foamed plastic article fabricated according to the present invention.
Figure 3:
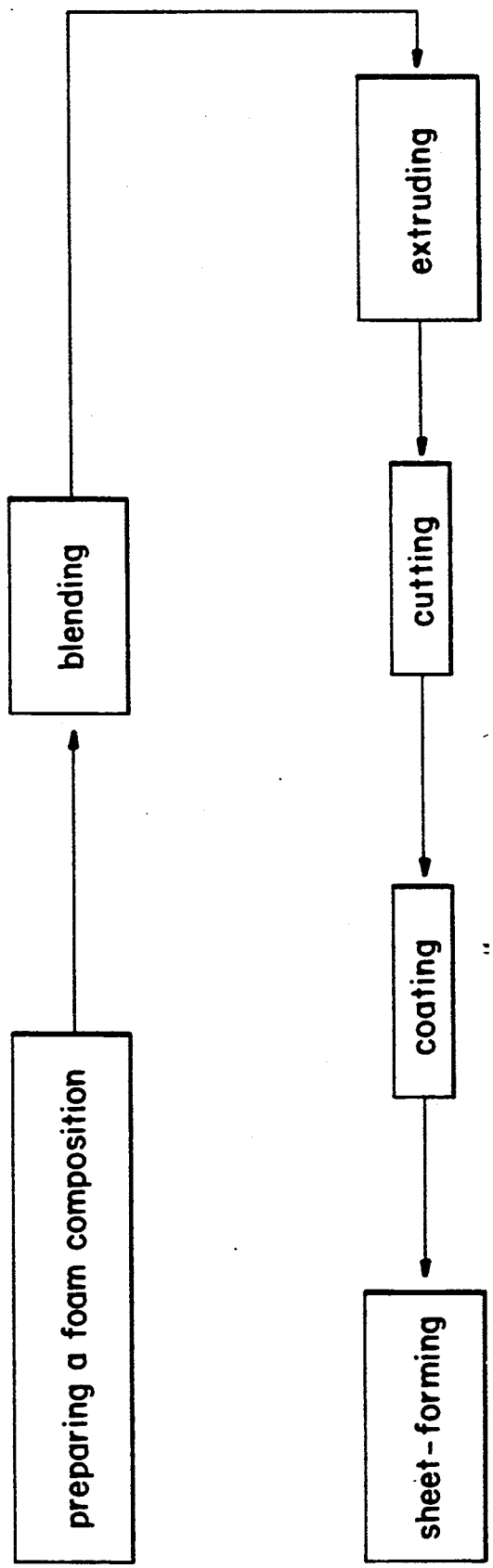
FIG. 3 is a flow diagram illustrating another embodiment of the present invention.

FIG. 2 shows a grained and foamed plastic sheet formed by the process of the invention wherein grains 12 are in one color, and grain boundary lines 10 and 11 are two different colors. Alternatively, the grains can be two colors. To form dual-colored grains, it is necessary to prepare two different colored foam compositions which must be extruded, coated and cut separately. The separate groups of grains are then mixed in an appropriate ratio according to the desired pattern.

Another preferred embodiment of the present invention is illustrated in FIG. 2. The process in this embodiment is substantially similar to that of the previous embodiment except for that the extruded rods are cut into grains before the coating process. In this case, the grains are mixed with a coloring agent in a suitable solution.

With the invention thus explained, it is apparent that various modifications and variations can be made without departing from the scope of the invention. It is therefore intended that the invention be limited as indicated in the appended claims.

I claim:

1. A process for making a grained and foamed plastic article comprising:
   (a) forming a foam composition in one color into foamed plastic rods by an extrusion process;
   (b) coating said foamed plastic rods with another color different from the color of said foamed plastic rods;
   (c) cutting said foamed plastic rods into grains after the step (b); and
   (d) forming the coated grains into a desired shape by heating and pressurizing, whereby clear boundary lines are formed between adjacent grains.

2. A process as claimed in claim 1, wherein said foam composition is prepared by using a polymeric material selected from the group consisting of natural rubber, styrene butadiene rubber, polyethyl vinyl acetate, polyethylene, and polypropylene.

3. A process as claimed in claim 1, wherein the step (b) is done by a dipping process before the step (c).

4. A process as claimed in claim 1, wherein the step (b) is done by passing said foamed plastic rods through a spaying device before the step (c).

5. A process for making a grained and foamed plastic article comprising:
   (a) forming a foam composition in one color into foamed plastic rods by an extrusion process;
   (b) coating said foamed plastic rods with more than one color which is different from the color of said foamed plastic rods;
   (c) cutting said foamed plastic rods into grains after the step (b);
   (d) mixing said coated grains of different colors in an appropriate ratio according to the desired grained pattern; and
   (e) forming the mixed grains into a desired shape by heating and pressurizing, whereby clear boundary lines are formed between adjacent grains.

* * * * *